(12) United States Patent
Buch et al.

(10) Patent No.: US 11,387,031 B2
(45) Date of Patent: Jul. 12, 2022

(54) VACUUM FILTRATION SYSTEM

(71) Applicant: C. C. JENSEN A/S, Svendborg (DK)

(72) Inventors: Henning Buch, Svendborg (DK); Svend Erik Lem, Svendborg (DK)

(73) Assignee: C. C. JENSEN A/S

( * ) Notice: Subject to any disclaimer, the term of this patent is extended or adjusted under 35 U.S.C. 154(b) by 203 days.

(21) Appl. No.: 16/645,037

(22) PCT Filed: Sep. 27, 2018

(86) PCT No.: PCT/DK2018/050236
§ 371 (c)(1),
(2) Date: Mar. 6, 2020

(87) PCT Pub. No.: WO2019/063054
PCT Pub. Date: Apr. 4, 2019

(65) Prior Publication Data
US 2021/0027929 A1    Jan. 28, 2021

(30) Foreign Application Priority Data
Sep. 27, 2017  (DK) .......................... PA 2017 70731

(51) Int. Cl.
*H01F 27/14* (2006.01)
*B01D 37/04* (2006.01)
*B01D 19/02* (2006.01)

(52) U.S. Cl.
CPC ............. *H01F 27/14* (2013.01); *B01D 19/02* (2013.01); *B01D 37/046* (2013.01); *B01D 2201/204* (2013.01)

(58) Field of Classification Search
CPC ....... H01F 27/14; B01D 19/02; B01D 37/046; B01D 2201/204
See application file for complete search history.

(56) References Cited

U.S. PATENT DOCUMENTS

| | | | |
|---|---|---|---|
| 3,914,528 A * | 10/1975 | Johnson | .............. H01F 27/14 174/11 R |
| 6,048,454 A | 4/2000 | Jenkins | |
| 6,174,351 B1 | 1/2001 | McDowell et al. | |
| 6,554,579 B2 | 4/2003 | Martin et al. | |
| 2005/0040086 A1 | 2/2005 | Jensen | |
| 2016/0008740 A1 | 1/2016 | Jensen et al. | |
| 2018/0059087 A1 * | 3/2018 | Robinson | .............. F15D 1/02 |

FOREIGN PATENT DOCUMENTS

| | | |
|---|---|---|
| CN | 102228753 A | 11/2011 |
| CN | 206271510 U | 6/2017 |

* cited by examiner

*Primary Examiner* — Liam Royce
(74) *Attorney, Agent, or Firm* — Luedeka Neely Group, PC

(57) ABSTRACT

An oil filtration system for purifying oil present in a reservoir. The system includes an inlet for receiving an inlet flow of contaminated oil from said reservoir, an outlet for releasing an outlet flow of purified oil to said reservoir, a vacuum housing in fluid communication with the inlet and the outlet, where the vacuum housing comprises an oil filter arranged in-side said housing, a first pumping unit which is arranged upstream of the vacuum housing, a second pumping unit which is arranged downstream of the vacuum housing, and a vacuum-generating means which is connected to the vacuum housing via a pumping tube, where the pumping flow rate of said second pumping unit is higher than the pumping flow rate of said first pumping unit.

20 Claims, 1 Drawing Sheet

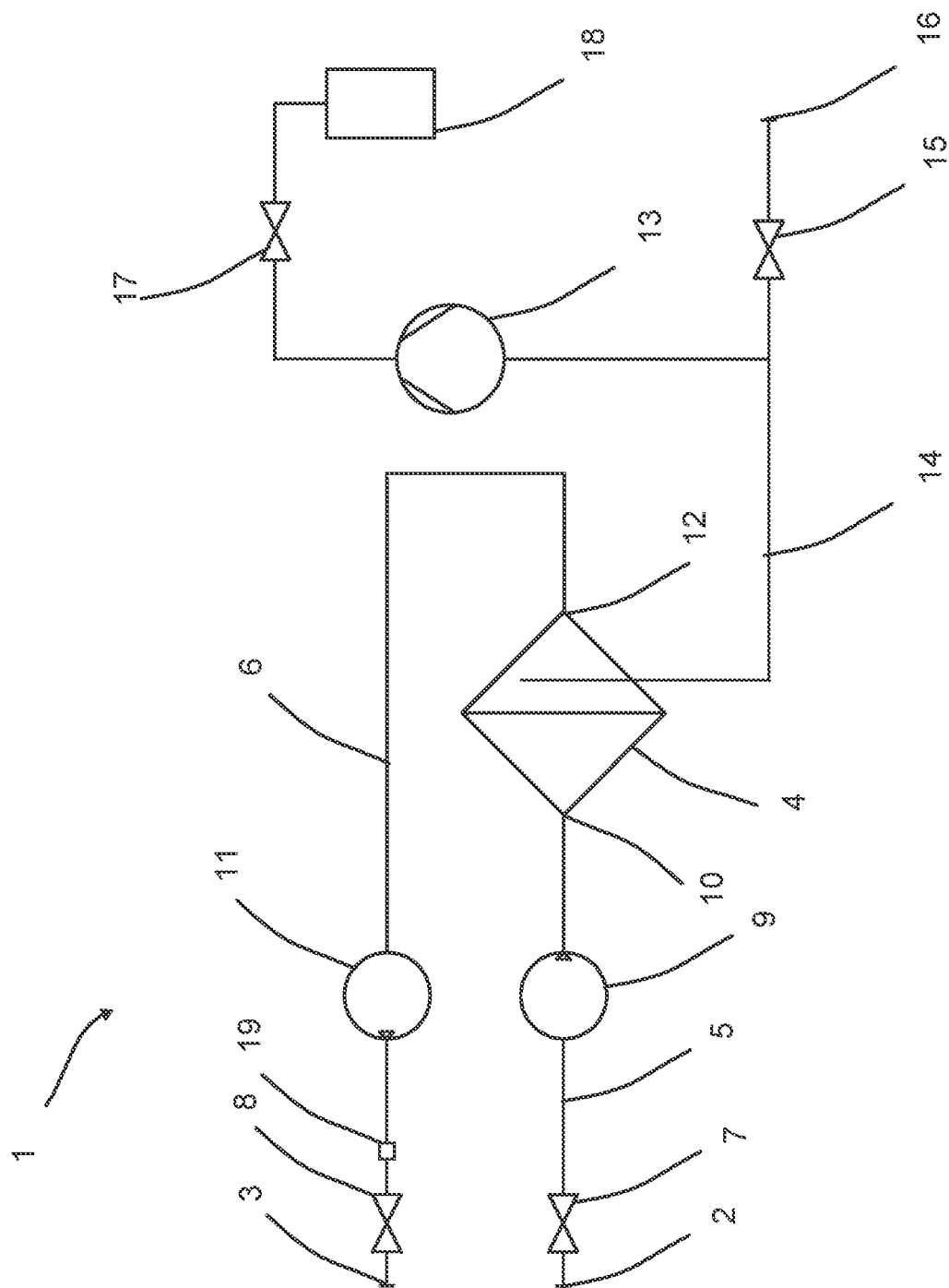

VACUUM FILTRATION SYSTEM

The present invention relates to an oil filtration system for purifying oil present in a reservoir, the system comprising:
- a system inlet for receiving an inlet flow of contaminated oil from said reservoir,
- a system outlet for releasing an outlet flow of purified oil to said reservoir,
- a vacuum housing which is in fluid communication with the system inlet and the system outlet, where the vacuum housing comprises an oil filter arranged inside said housing which oil filter is adapted to receive the contaminated oil and to release filtered oil,
- a first pumping unit which is arranged upstream of the vacuum housing, where the first pumping unit is adapted to provide a flow of contaminated oil in a direction from the system inlet to an inlet of the vacuum housing at a fixed pumping flow rate,
- a second pumping unit which is arranged downstream of the vacuum housing, where the second pumping unit is adapted to provide a flow of purified oil in a direction from an outlet of the vacuum housing to the system outlet at a pumping flow rate,
- a vacuum-generating means which is connected to the vacuum housing via a pumping tube and is adapted to pump a gas filled portion of said vacuum housing,
- where said second pumping unit is adapted to provide a flow at a higher pumping flow rate than the pumping flow rate provided by said first pumping unit.

The present invention further relates to a transformer including an oil filtration system and to a method of purifying oil present in a reservoir.

High-voltage transformers are used as part of the power supply network and as a vital part of the high-voltage electricity grid. A high-voltage transformer comprises five essential components, i.e. an iron core, a winding, an insulating material, a coolant and a casing. The winding in the high-voltage transformer is insulated. The insulating material may be made of different types of materials, but it is typically made of paper, such as cellulose, wound round the conductors in the winding.

Various materials may be used as coolant in a high-voltage transformer, but oil is commonly used. Oil is a very effective coolant, the specific heat capacity and the heat transfer coefficient thereof being superior to those of air. Naturally, the object of the casing of a high-voltage transformer is to enclose the iron core and the winding, but in addition thereto, the casing serves as a tank for the transformer oil.

The transformer oil also constitutes a vital part of the transformer insulation as it increases the dielectric strength of the transformer. However, many factors may decrease the dielectric strength size such as dissolved water, contaminating particles, oil degradation by-products or dissolved gases in the transformer oil. These contaminating elements occur as electric dipoles and tend to create bridges between conducting parts of the transformer at different electrical potentials.

Several reasons exist as to why the oil in a high-voltage transformer becomes contaminated such as:
- When the oil is filled into the transformer at the manufacture of the high-voltage transformer,
- If a leak arises in the transformer during operation,
- If gases are introduced in the oil via an open expansion tank or a broken/leaking expansion tank bladder/barrier,
- During service,
- Particles generated during operation of the transformer, such as cellulose, copper particles, iron particles and carbon particles,
- Oil degradation by-products, such as sludge and water.

Despite being properly dried before the oil is filled into the transformer, the paper insulation of the transformer windings contains an amount of water. Consequently, when the high-voltage transformer switches from being loaded to running idle, a situation may arise in which the temperature drops to a point at which the oil's relative humidity reaches a given threshold limit. Another factor is the variations in the temperature and the possible presence of oxygen which cause the transformer oil and the paper insulation to age. Ageing is the disintegration of a material and may thus cause the formation of decomposition products in the oil in form of particles, gases and water.

It is known to purify/clean the contaminated oil from the transformer in an oil filtration system comprising an oil filter placed inside a vacuum chamber (vacuum housing). Contaminants in the form of particles may then be retained by the filter, whereas contaminants in the form of water and dissolved gases may be removed from the oil as vapour due to the vacuum created in the vacuum chamber. However, removing water and dissolved gases from the oil by use of vacuum may result in the formation of foam in the oil which may with time escape the vacuum chamber and move to and damage the vacuum pump creating the vacuum. Thus, to control the formation of an excessive amount of foam, it is known to provide one or more sensors in the vacuum chamber to monitor the formation of foam so that the user may react in case the formation of foam becomes too excessive.

In existing oil filtration systems, inlet oil flow rate is controlled by a nozzle (flow limiter) whereas the outlet oil flow rate is controlled by an oil pump, balanced in such a way that a constant oil level in the vacuum chamber (vacuum housing) is maintained. As the pressure in the vacuum chamber may vary, and thus the differential pressure across the inlet nozzle/flow limiter and the resulting flow rate, there is a need for continuous monitoring and control of the oil level in the vacuum chamber, by controlling either the inlet nozzle/flow limiter or the capacity of the outlet pump or both, either manually or automatically using a complicated control system. The formation of foam makes it difficult to monitor the true oil level in the vacuum chamber, and thus requires a complicated control process.

In accordance with the invention, there is provided an oil filtration system for purifying oil present in a reservoir, the system comprising:
- a system inlet for receiving an inlet flow of contaminated oil from said reservoir,
- a system outlet for releasing an outlet flow of purified oil to said reservoir,
- a vacuum housing which is in fluid communication with the system inlet and the system outlet, where the vacuum housing comprises an oil filter arranged inside said housing, which oil filter is adapted to receive the contaminated oil and to release filtered oil,
- a first pumping unit which is arranged upstream of the vacuum housing, where the first pumping unit is adapted to provide a flow of contaminated oil in a direction from the system inlet to an inlet of the vacuum housing at a fixed pumping flow rate,
- a second pumping unit which is arranged downstream of the vacuum housing, where the second pumping unit is adapted to provide a flow of purified oil in a direction from an outlet of the vacuum housing to the system outlet at a pumping flow rate, a vacuum-generating means which is connected to the vacuum housing via a pumping tube and is adapted to pump a gas filled portion of said vacuum housing, where said second pumping unit is adapted to provide a flow at a higher pumping flow rate than the pumping flow rate provided by said first pumping unit.

Thus, the pumping flow rate of said second pumping unit may be higher than the pumping flow rate of said first pumping unit.

Within the present invention, the term vacuum-generating means may be understood as a means which is capable of providing an absolute pressure (pressure above absolute zero) in the vacuum housing in the mbar range or lower.

By providing a first pumping unit with a fixed pumping flow rate (that does not depend on the pressure drop across the first pumping unit) and providing a second pumping unit with a pumping flow rate which is higher than the fixed pumping flow rate of the first pumping unit, the vacuum housing basically never contains a substantial amount of oil (i.e. is basically always empty or close to empty), as the oil is removed immediately after being filtered. Thus, the amount of oil and therefore the level of oil in the vacuum housing can be controlled/regulated.

Further, as the amount of oil and therefore the level of oil in the vacuum housing can be controlled/regulated, there is no need for providing a complicated regulation system or a sensor for sensing the level of oil in the vacuum housing, which simplifies the oil filtration system considerably.

Usually, one would not provide a system in which the pumping flow rate of the pumping unit downstream of the vacuum housing is higher than the pumping flow rate of the pumping unit upstream of the vacuum housing, as the pumping unit downstream of the vacuum housing would run dry (cavitation in pumping unit) and therefore be damaged. However, the present invention applies a pumping unit which is allowed to run dry, as it provides the possibility of controlling/regulating the amount of oil and therefore the level of oil in the vacuum housing.

Thus, a simplified oil filtration system which controls/regulates the amount of oil in the vacuum housing, is provided.

In an embodiment, said second pumping unit can be adapted to provide a flow at a pumping flow rate which is at least 25% higher than the pumping flow rate provided by said first pumping unit.

The inventors have found it sufficient to provide a pumping flow rate of the second pumping unit being at least 25% higher than the pumping flow rate of the first pumping unit to prevent the foam formation from entering the vacuum pump and thereby damaging the vacuum pump.

In an embodiment, said second pumping unit can be adapted to provide a flow at a pumping flow rate which is 25% to 50% higher than the pumping flow rate provided by the first pumping unit.

The inventors have found it sufficient to provide a pumping flow rate of the second pumping unit being 25% to 50% higher than the pumping flow rate of the first pumping unit to ensure that the inlet flow is properly balanced by the outlet flow and prevent a rising liquid level in the vacuum housing and thereby a damaging of the vacuum-generating means.

In an embodiment, the oil filtration system can further comprise a pressure-regulating device connected to said pumping tube and arranged downstream of the vacuum housing and upstream of said vacuum-generating means.

During start-up of the oil filtration system, a high degree of impurities such as water and gas (e.g. $H_2$ and $CO_2$) may be present in the oil. At low pressure (e.g. below 20 mbar absolute pressure), the solubility of gas and water in the oil and the boiling point of the water are reduced (compared to at 1 bar), so that the dissolved gas and water are boiled off the oil which results in that foam being created in the oil. As the degree of impurities is high during start-up, a lot of foam may be formed, and the pressure-regulating device may therefore advantageously be opened to increase the pressure in the vacuum housing. Thereby, the foam formation is reduced so that the risk of the foam entering the vacuum-generating means is eliminated.

After start-up of the oil filtration system, the pressure in the vacuum housing may eventually reach an absolute pressure of 2-3 mbar. However, the mixture of gases and water extracted from the vacuum housing may with time condense in the sump of the vacuum-generating means resulting in a slow increase in absolute pressure in the vacuum housing (e.g. to 5 mbar). At this point, it may be advantageous to open the pressure-regulating device for a short interval so as to introduce air on the suction side of the vacuum-generating means which will help the vacuum-generating means to remove the condensed water and gases. Thereby, the pressure in the vacuum housing can once again reach a relatively low level (2-3 mbar).

In an embodiment, the pressure-regulating valve can comprise a first valve adapted to introduce a flow of gas into said pumping tube and said vacuum housing.

A valve is an effective and reliable means of introducing a flow of gas into the pumping tube and vacuum housing. Both automatically and manually operated valves are foreseen.

In an embodiment, the first valve can be adapted to introduce a gas of varying flow rate into said pumping tube and said vacuum housing, where said flow rate can depend on the pressure in the gas-filled portion of said vacuum housing.

The first valve may be able to be modulated and/or may be adapted to introduce a gas of varying flow rate into the vacuum housing. Said modulation/variation may be based on the pressure and/or temperature in the gas-filled portion of the vacuum housing. Thereby, gas may be introduced into the vacuum housing at a flow rate depending on the required need. The flow rate may be controlled automatically, such as the flow rate being set based on predetermined time intervals or on a comparison of a measured value and a reference value.

Alternatively, the modulation/variation may be controlled manually by the operator based on a monitoring of one or more parameters in the vacuum housing or of the oil, such as the pressure and/or temperature.

By varying/modulating said first valve, the capacity of the vacuum-generating means is also varied/modulated in that an increasing amount of gas may be pumped by the vacuum-generating means as the pressure in said pumping tube and vacuum housing increases.

In an embodiment, the oil filtration system can further comprise a hydraulic resistance arranged downstream of said second pumping unit and upstream of said system outlet, where said hydraulic resistance is adapted to provide a fluid/liquid flow restriction between said second pumping unit and said system outlet.

Providing a hydraulic resistance downstream of said second pumping unit facilitates the operation of the second pumping unit.

In an embodiment, an inner filter volume of the oil filter can be connected to the inlet of the vacuum housing, and a filter outlet, which is defined by an outer surface of the oil filter, can be connected to the outlet of the vacuum housing.

By providing a filter outlet which is defined by an outer surface of the oil filter, the liquid surface of the filtered oil is maximised at the filter outlet. Combined with a low pressure in the gas-filled part of the vacuum housing created by the vacuum-generating means (e.g. 2-3 mbar), both the solubility of water and the boiling point of water are reduced (compared to at 1 bar), which results in that the water in the filtered oil is more easily evaporated and is therefore more effectively removed from the oil. Impurities in the form of particles in the oil are retained by the filter, when the oil passes through the filter.

Therefore, oil may enter the vacuum housing through the inlet of the vacuum housing and thereafter enter the inner filter volume (inner opening of the oil filter). From the inner filter volume, the oil may move through the oil filter (filter material) to the outer surface of the oil filter (filter outlet), and from the outer surface of the oil filter to the outlet of the vacuum housing.

The present invention further relates to a transformer including an oil filtration system according to any of the embodiments identified above.

The present invention further relates to a method of purifying oil present in a reservoir, the method comprising:
- providing a system inlet for receiving an inlet flow of contaminated oil from said reservoir,
- providing a system outlet for releasing an outlet flow of purified oil to said reservoir,
- providing a vacuum housing which is in fluid communication with the system inlet and the system outlet, where the vacuum housing comprises an oil filter arranged inside said housing, which oil filter receives the contaminated oil and releases filtered oil,
- providing a first pumping unit upstream of the vacuum housing, where the first pumping unit provides a flow of contaminated oil in a direction from the system inlet to an inlet of the vacuum housing at a fixed pumping flow rate,
- providing a second pumping unit downstream of the vacuum housing, where the second pumping unit provides a flow of purified oil in a direction from an outlet of the vacuum housing to the system outlet at a pumping flow rate,
- providing a vacuum-generating means which is connected to the vacuum housing via a pumping tube and pumps a gas-filled portion of said vacuum housing,
- where said second pumping unit provides a flow at a higher pumping flow rate than the pumping flow rate provided by said first pumping unit.

In an embodiment, said second pumping unit can provide a flow at a pumping flow rate which is at least 25% higher than the pumping flow rate provided by said first pumping unit.

In an embodiment, said second pumping unit can provide a flow at a pumping flow rate which is 25% to 50% higher than the pumping flow rate provided by said first pumping unit.

The structure and function of the oil filtration system and the method of using it will be described in more detail below with reference to the exemplary embodiment shown in the drawing.

FIG. 1 shows an embodiment of an oil filtration system comprising a vacuum housing with an oil filter.

The oil filtration system 1 comprises a system inlet 2, a system outlet 3, and a vacuum housing 4. The system inlet 2 is adapted to receive an inlet flow of contaminated oil from a reservoir (not shown), and the system outlet 3 is adapted to release an outlet flow of purified oil to said reservoir. The reservoir may be the oil contained in the casing of a transformer, or in any other type of container for containing oil, such as isolation oil.

The vacuum housing 4 is in fluid communication with the system inlet 2 and the system outlet 3 via an inlet tube 5 and an outlet tube 6, respectively. A temperature sensor (not shown) may measure the temperature in the vacuum housing 4, such as in the gas-filled portion of said vacuum housing 4.

The oil filtration system 1 may further comprise an inlet valve 7 and an outlet valve 8. The inlet valve 7 may be arranged in the inlet tube 5 for controlling the inlet flow of oil, and said inlet valve 7 may be a solenoid valve. The outlet valve 8 may be arranged in the outlet tube 6 for controlling the outlet flow of oil, and said outlet valve 8 may be a solenoid valve.

A first pumping unit 9 (a supply pump) may be arranged in the inlet tube 5, upstream of the vacuum housing 4, and be adapted to provide a flow of oil in a direction from the system inlet 2 to an inlet 10 of the vacuum housing 4 at a pumping flow rate. The first pumping unit 9 may as such be a metering pump.

A second pumping unit 11 (a discharge pump) may be arranged in the outlet tube 6, downstream of the vacuum housing 4 and be adapted to provide a flow of oil in a direction from an outlet 12 of the vacuum housing 4 to the system outlet 3 at a pumping flow rate. A backpressure valve 19 may be arranged downstream of the second pumping unit 11 and upstream of the outlet valve 8 to provide a backpressure on the second pumping unit 11.

The vacuum housing 4 comprises an oil filter (not shown) arranged inside said housing 4 which oil filter is adapted to receive contaminated oil and to release filtered oil. The oil filter may comprise a natural or synthetic polymer. The oil filter may comprise a cellulose material.

The oil filter may comprise an inner opening (an inner filter volume) which defines an inlet of the oil filter and which may extend along a longitudinal axis of the oil filter. Said inner opening (inner filter volume) of the oil filter may be connected to the inlet 10 of the vacuum housing 4, such that the oil entering the vacuum housing 4 enters the inlet of the oil filter. The filter outlet may be defined by an outer surface of the oil filter. The filter outlet may be connected to (be in fluid communication with) the outlet 12 of the vacuum housing 4 in that the filtered oil exiting the oil filter flows from the filter outlet to the outlet 12 of the vacuum housing 4.

The oil filtration system 1 further comprises a vacuum-generating means 13 connected to the vacuum housing 4 via a pumping tube 14. The vacuum-generating means 13 may be a vacuum pump 13 such as a liquid ring pump. The pumping tube 14 may be connected to the vacuum housing 4 and extend into a gas-filled portion of the vacuum housing 4, so that the vacuum-generating means 13 may be adapted to pump the gas-filled portion of said vacuum housing 4 and thereby create vacuum in the gas filled portion of the vacuum housing 4. Said gas-filled portion may be arranged on the outside of the oil filter and thereby be in contact with the filtered oil in the vacuum housing 4.

Thus, the pumping of the vacuum housing 4 facilitates that the oil, which has entered the inner opening (inner filter volume) of the oil filter, is moving through the filter material due to the pressure drop between said inner opening and the gas-filled portion of the vacuum housing 4. Thereby, impurities in the form of particles in the oil are retained by the filter. Furthermore, the outer surface of the porous oil filter may have a large surface area. Combined with the low pressure in the gas filled part of the vacuum housing 4 created by the vacuum-generating means 13, both the solubility of water and the boiling point of water are reduced (compared to at 1 bar), which results in that the water in the filtered oil is more easily evaporated and thereby removed through the pumping tube 14.

A pressure-regulating device may be connected to said pumping tube 14 and may be arranged downstream of the vacuum housing 4 and up-stream of said vacuum-generating means 13 (when considering that the vacuum-generating means 13 is pumping water vapour and gas from the vacuum housing 4 to the vacuum-generating means 13). The pressure-regulating device may comprise a first valve 15 adapted to introduce a flow of gas from a device inlet 16 into said pumping tube 14 and said vacuum housing 4 due to the low pressure created by the vacuum-generating means 13. Thereby, the pressure in the vacuum housing 4 and in the pumping tube 14 can be controlled which is advantageous in terms of reducing the formation of foam in the vacuum housing 4 (i.e. increasing the pressure reduces the foam formation). Further, providing a first valve 15 may be advantageous in terms of facilitating that the vacuum-generating means 13 is functioning properly. This is due to the mixture of gases and water extracted from the vacuum housing 4 maybe condensing in the sump of the vacuum-generating means 13, but may be prevented/removed by supplying air on the suction side of the vacuum-generating means 13.

The first valve 15 of the pressure-regulating device may be adapted to introduce a varying flow rate of gas (e.g. atmospheric air) into said pumping tube 14 and said vacuum housing 4, where said flow rate may depend on the pressure or temperature in the gas-filled portion of said vacuum housing 4. The pressure and temperature may be measured by pressure and temperature sensors, respectively. The variation of the flow rate may be carried out automatically or manually.

A pressure sensor and/or a liquid level sensor arranged in the pressure-regulating device may assist in controlling the functioning of the pressure-regulating device such as whether or not the first valve 15 should be activated.

In the pumping tube 14, downstream of the vacuum-generating means 13 a gas release valve 17 may be arranged. The gas release valve 17 may be controlled based on measurement of the pressure in the pumping tube 14 downstream of the vacuum-generating means 13 and upstream of said gas release valve 17. Said pressure may be measured by use of a pressure sensor (not shown).

Said gas release valve 17 may be used to give an early warning of an increased contamination of the oil. This may be done by closing said gas release valve 17 for a time interval (e.g. 200, 300 or 400 seconds) so that the pressure in the pumping tube 14 downstream of the vacuum-generating means 13 and upstream of said gas release valve 17 increases, which may be measured/monitored by said pressure sensor. The rate of increase of the pressure (pressure gradient) may be used to determine whether or not the contamination of the oil by gases and water has increased, and thereby give the mentioned early warning.

Gases and water extracted from the oil in the vacuum housing 4 may be collected in a tank 18 comprising a sampling valve, where the tank 18 may be arranged downstream of the gas release valve 17.

A sample of the extracted gases and water may therefore be taken from the tank 18 via the sampling valve and be analysed quantitatively and qualitatively and provide information about inter alia the remaining life of the oil (such as the transformer oil) and of the existence of leaks in the reservoir.

The invention claimed is:

1. An oil filtration system for purifying oil present in a reservoir, the system comprising:
    a system inlet for receiving an inlet flow of contaminated oil from said reservoir,
    a system outlet for releasing an outlet flow of purified oil to said reservoir,
    a vacuum housing which is in fluid communication with the system inlet and the system outlet, where the vacuum housing comprises an oil filter arranged inside said housing, which oil filter is adapted to receive the contaminated oil and to release filtered oil,
    a first pumping unit which is arranged upstream of the vacuum housing, where the first pumping unit is adapted to provide a flow of contaminated oil in a direction from the system inlet to an inlet of the vacuum housing at a fixed pumping flow rate,
    a second pumping unit which is arranged downstream of the vacuum housing, where the second pumping unit is adapted to provide a flow of purified oil in a direction from an outlet of the vacuum housing to the system outlet at a pumping flow rate,
    a vacuum-generating means which is connected to the vacuum housing via a pumping tube and is adapted to pump a gas-filled portion of said vacuum housing,
characterised in that
    said second pumping unit is adapted to provide a flow at a higher pumping flow rate than the pumping flow rate provided by said first pumping unit,
    said oil filtration system comprises a pressure-regulating device connected to said pumping tube and arranged downstream of said vacuum housing and upstream of said vacuum-generating means, and
    said pressure-regulating device further comprising a gas release valve positioned downstream of the vacuum-generating means and a pressure sensor for measuring the pressure in the pumping tube between the downstream of the vacuum generating means and upstream of the gas release valve.

2. The oil filtration system according to claim 1, where said second pumping unit is adapted to provide a flow at a pumping flow rate which is at least 25% higher than the pumping flow rate provided by said first pumping unit.

3. The oil filtration system according to claim 2, where said second pumping unit is adapted to provide a flow at a pumping flow rate which is 25% to 50% higher than the pumping flow rate provided by the first pumping unit.

4. The oil filtration system according to claim 1, where the pressure-regulating device comprises a first valve adapted to introduce a flow of gas into said pumping tube and said vacuum housing.

5. The oil filtration system according to claim 4, where the first valve is adapted to introduce a gas of varying flow rate into said pumping tube and said vacuum housing, where said flow rate depends on the pressure in the gas-filled portion of said vacuum housing.

6. The oil filtration system according to claim 1, where the oil filtration system further comprises a hydraulic resistance arranged downstream of said second pumping unit and upstream of said system outlet, where said hydraulic resistance is adapted to provide a fluid/liquid flow restriction between said second pumping unit and said system outlet.

7. The oil filtration system according to claim 1, where an inner filter volume of the oil filter is connected to the inlet of the vacuum housing, and a filter outlet, which is defined by an outer surface of the oil filter, is connected to the outlet of the vacuum housing.

8. A transformer comprising the oil filtration system according to claim 1.

9. A method of purifying oil present in a reservoir, the method comprising:
    providing a system inlet for receiving an inlet flow of contaminated oil from said reservoir,
    providing a system outlet for releasing an outlet flow of purified oil to said reservoir,
    providing a vacuum housing which is in fluid communication with the system inlet and the system outlet, where the vacuum housing comprises an oil filter arranged inside said housing, which oil filter receives the contaminated oil and releases filtered oil,
    providing a first pumping unit upstream of the vacuum housing, where the first pumping unit provides a flow of contaminated oil in a direction from the system inlet to an inlet of the vacuum housing at a fixed pumping flow rate,
    providing a second pumping unit downstream of the vacuum housing, where the second pumping unit provides a flow of purified oil in a direction from an outlet of the vacuum housing to the system outlet at a pumping flow rate,
    providing a vacuum-generating means which is connected to the vacuum housing via a pumping tube and pumps a gas-filled portion of said vacuum housing,
    characterised in that,
    said second pumping unit provides a flow at a higher pumping flow rate than the pumping flow rate provided by said first pumping unit, and
    providing a pressure-regulating device connected to said pumping tube and arranged downstream of said vacuum housing and upstream of said vacuum-generating means, and
    providing early warning of an increased contamination of the oil is provided by closing a gas release valve positioned in the pumping tube downstream of the vacuum-generating means for a time interval so that the pressure in the pumping tube downstream of the vacuum-generating means and upstream of said gas release valve increases and measuring said increase with a pressure sensor.

10. The method according to claim 9, where said second pumping unit provides a flow at a pumping flow rate which is at least 25% higher than the pumping flow rate provided by said first pumping unit.

11. The method according to claim 10, where said second pumping unit provides a flow at a pumping flow rate which is 25% to 50% higher than the pumping flow rate provided by said first pumping unit.

12. The oil filtration system according to claim 2, where the pressure-regulating device comprises a first valve adapted to introduce a flow of gas into said pumping tube and said vacuum housing.

13. The oil filtration system according to claim 2, where the oil filtration system further comprises a hydraulic resistance arranged downstream of said second pumping unit and upstream of said system outlet, where said hydraulic resistance is adapted to provide a fluid/liquid flow restriction between said second pumping unit and said system outlet.

14. The oil filtration system according to claim 2, where an inner filter volume of the oil filter is connected to the inlet of the vacuum housing, and a filter outlet, which is defined by an outer surface of the oil filter, is connected to the outlet of the vacuum housing.

15. The oil filtration system according to claim 3, where an inner filter volume of the oil filter is connected to the inlet of the vacuum housing, and a filter outlet, which is defined by an outer surface of the oil filter, is connected to the outlet of the vacuum housing.

16. The oil filtration system according to claim 3, where the pressure-regulating device comprises a first valve adapted to introduce a flow of gas into said pumping tube and said vacuum housing.

17. The oil filtration system according to claim 3, where the oil filtration system further comprises a hydraulic resistance arranged downstream of said second pumping unit and upstream of said system outlet, where said hydraulic resistance is adapted to provide a fluid/liquid flow restriction between said second pumping unit and said system outlet.

18. The oil filtration system according to claim 4, where the oil filtration system further comprises a hydraulic resistance arranged downstream of said second pumping unit and upstream of said system outlet, where said hydraulic resistance is adapted to provide a fluid/liquid flow restriction between said second pumping unit and said system outlet.

19. The oil filtration system according to claim 5, where the oil filtration system further comprises a hydraulic resistance arranged downstream of said second pumping unit and upstream of said system outlet, where said hydraulic resistance is adapted to provide a fluid/liquid flow restriction between said second pumping unit and said system outlet.

20. The oil filtration system according to claim 5, where an inner filter volume of the oil filter is connected to the inlet of the vacuum housing, and a filter outlet, which is defined by an outer surface of the oil filter, is connected to the outlet of the vacuum housing.

* * * * *